US006203087B1

United States Patent
Lance et al.

(10) Patent No.: US 6,203,087 B1
(45) Date of Patent: *Mar. 20, 2001

(54) VEHICLE MOUNTED STORAGE UNIT

(75) Inventors: Marshall Lance, Geneva; Sandra Lance, South Elgin, both of IL (US)

(73) Assignee: Geneva Manufacturing Company, South Elgin, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/359,333

(22) Filed: Jul. 21, 1999

Related U.S. Application Data

(63) Continuation-in-part of application No. 09/030,301, filed on Feb. 25, 1998, now abandoned, which is a continuation of application No. 08/861,183, filed on May 21, 1997, now Pat. No. 5,743,584, which is a continuation of application No. 08/457,875, filed on Jun. 1, 1995, now abandoned.

(51) Int. Cl.[7] ...................................................... B60R 11/06
(52) U.S. Cl. ........................ 296/37.6; 312/311; 224/403
(58) Field of Search .................................. 296/37.6, 37.8, 296/37.16; 312/310, 311; 224/402, 403, 404, 488

(56) References Cited

U.S. PATENT DOCUMENTS

| D. 305,315 | 1/1990 | Fletcher ............................... D12/157 |
| 3,826,529 | 7/1974 | Wood .................................. 296/37 R |
| 4,085,961 | 4/1978 | Brown ................................. 296/37.6 |
| 4,469,364 | 9/1984 | Rafi-Zadeh .......................... 296/37.6 |
| 4,573,731 | 3/1986 | Knaack et al. ....................... 296/376 |
| 4,789,195 | 12/1988 | Fletcher .............................. 296/37.6 |
| 4,889,377 | 12/1989 | Hughes ..................................... 296/3 |
| 4,898,284 | 2/1990 | Arens ..................................... 211/162 |
| 4,971,234 | 11/1990 | Hay .................................... 224/42.32 |
| 5,015,025 | 5/1991 | Henriquez ........................... 296/37.6 |
| 5,076,630 | 12/1991 | Henriquez ............................ 296/37.6 |
| 5,121,306 | 6/1992 | Palmisano ....................... 296/37.6 X |
| 5,232,259 | 8/1993 | Booker ................................. 296/37.6 |
| 5,395,019 | 3/1995 | Christensen ..................... 224/403 X |
| 5,398,987 | 3/1995 | Sturgis ................................. 296/37.6 |

OTHER PUBLICATIONS

Hand–numbered documents 101–140.
Sidewinder ™ Tool Box advertisement. Author unknown. Time and place of publication unknown.
Sheets 1–6 (numbered in bottom right corner) transmitted to Marshall Lance by facsimile in Nov., 1994.
Complaint, Scot Tools v. Geneva Manufacturing Company.
Answer and Counterclaim, Scot Tools v. Geneva Manufacturing Company.

(List continued on next page.)

*Primary Examiner*—Joseph D. Pape
(74) *Attorney, Agent, or Firm*—Marshall, O'Toole, Gerstein, Murray & Borun

(57) ABSTRACT

A vehicle mounted storage unit, adapted to be mounted to a floor portion of a vehicle having a sidewall and a wheel well that extends outwardly from the sidewall by a first distance, includes a mounting bracket fixed to the floor portion of the vehicle and a plurality of connecting members that connect the mounting bracket to the floor portion. The mounting bracket has a width that is less than the first distance, and the mounting bracket is fixed to the floor portion of the vehicle at a mounting point adjacent the sidewall of the vehicle and adjacent the wheel well of the vehicle. The storage unit is provided with a cabinet that is attachable to the mounting bracket, with the cabinet being removable from the mounting bracket and having a width not greater than the first distance. The cabinet is adapted to be mounted adjacent the sidewall of the vehicle and adjacent the wheel well of the vehicle, with no portion of the cabinet extending beyond the wheel well of the vehicle. The storage unit is also provided with a quick-release mechanism that facilitates attachment of the cabinet to the mounting bracket and release of the cabinet from the mounting bracket, the quick-release mechanism allowing the cabinet to be mounted to the mounting bracket and removed from the mounting bracket without the use of a tool.

32 Claims, 9 Drawing Sheets

OTHER PUBLICATIONS

Plaintiff Scot Tools, Inc.'s Reply to the Counterclaims of Defendants, Scot Tools v. Geneva Manufacturing Company.

Counter–Defendant Darrah's Reply to the Claims of Defendants, Scot Tools v. Geneva Manufacturing Company.

Affidavit of Scott A. Darrah, Scot Tools v. Geneva Manufacturing Company.

Memorandum in Opposition to Defendants' Motion to Dismiss For Lack of Jurisdiction, Scot Tools v. Geneva Manufacturing Company.

Letter dated Aug. 25, 1998 from W. Randall Stroud to Allan W. Singer.

Transcript of deposition of Scott A. Darrah taken Mar. 10, 1998, 157 pages, Scot Tools v. Geneva Manufacturing Company.

Letter dated Sep. 24, 1998 from W. Randall Stroud to Allan W. Singer and enclosures to that letter, hand–No. 1–44.

Request for Reexamination of U.S. Patent No. 5,743,584 dated Dec. 9, 1998 3–Page PTO–1449 form received with the request for reexamination.

Documents No. 50–72 that were forwarded to Applicants' attorney from the requestor.

Snap–On Tools Catalog, 1982, 298 pages.

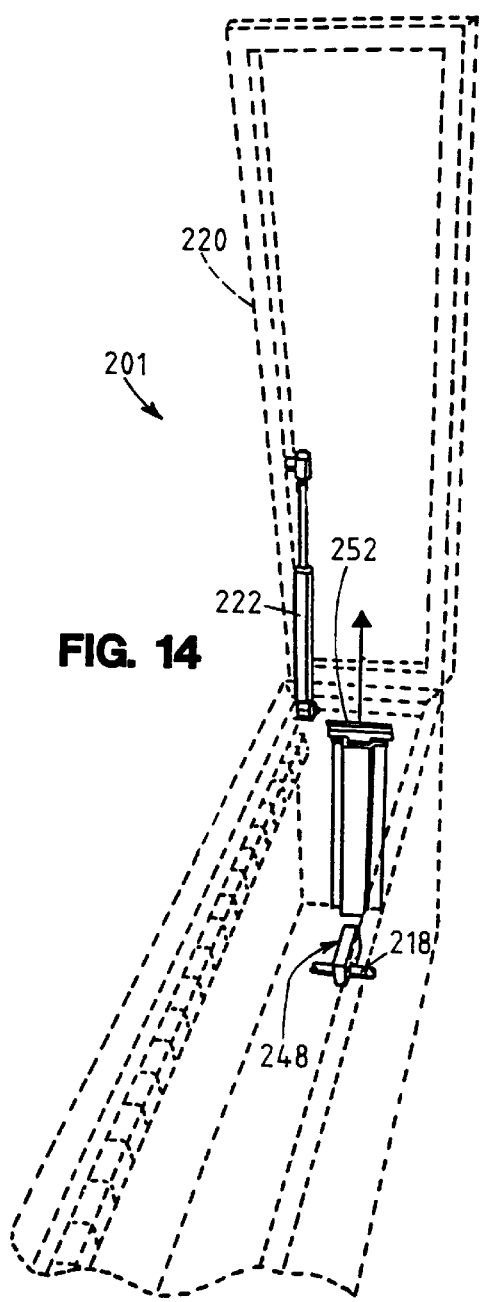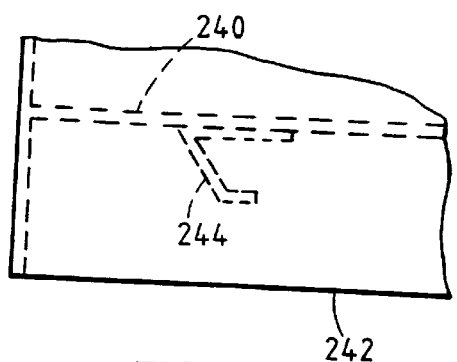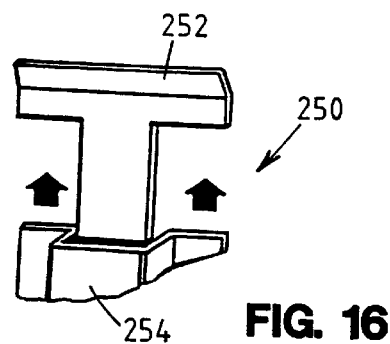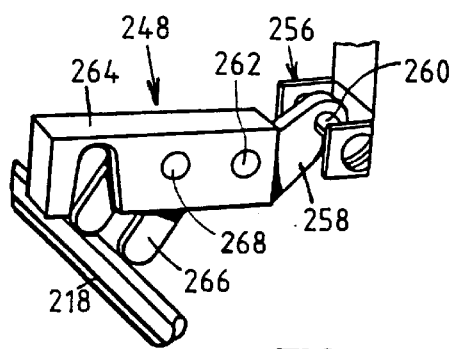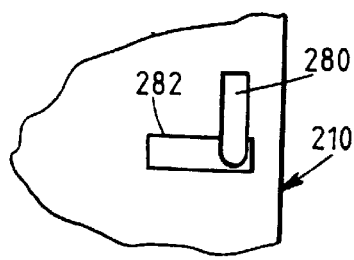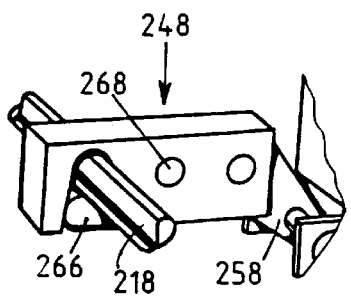

VEHICLE MOUNTED STORAGE UNIT

This is a continuation-in-part of U.S. Ser. No. 09/030,301 filed Feb. 25, 1998, now abandoned, which is a continuation of U.S. Ser. No. 08/861,183 filed May 21, 1997, now U.S. Pat. No. 5,743,584, which is a continuation of abandoned U.S. Ser. No. 08/457,875 filed Jun. 1, 1995, all of which are incorporated wholly herein by reference.

BACKGROUND OF THE INVENTION

The present invention relates to a storage unit for installation in a vehicle such as a pickup truck, van, or sport utility vehicle.

U.S. Pat. No. 5,398,987 to Sturgis discloses a tool box assembly for use in the bed of a pickup truck. The tool box assembly is composed of a storage container 24 that is mounted to the bed of the pickup truck and a tool box 26 that is pivotally mounted to the storage container 24 about a vertical pivot axis. The storage container 24 has a door 32 that is movable between an open position and a closed position, and the tool box 26 has a plurality of drawers 134, 135.

As shown in FIG. 1 of the Sturgis patent, the Sturgis tool box 26 is pivotable between a first position in which the tool box 26 is disposed within the storage container 24 and a second position in which the tool box 26 is disposed outside the storage container 24. When the tool box 26 is in the second position, the drawers 134, 135 of the tool box 26 may be pulled out of the tool box 26 in a direction towards the rear of the pickup truck.

SUMMARY OF THE INVENTION

The invention is directed, in one aspect, to a storage unit sized to be capable of being mounted to a rear floor portion of a vehicle having a vehicle sidewall, a wheel well having a portion which extends outwardly from a portion of the sidewall by a first distance in a first direction, and a rear vehicle door that is movable between a closed position and an open position, the rear vehicle door being spaced from a rear portion of the wheel well by a second distance in a second direction perpendicular to the first direction.

The storage unit may comprise a cabinet having a length not greater than the second distance which is capable of being disposed between the wheel well and the rear door of the vehicle, with no portion of the cabinet extending outside of a space boded by a horizontal plane coinciding with the floor portion of the vehicle, a first vertical plane coinciding with the rear portion of the wheel well, and a second vertical plane coinciding with an interior portion of the rear door when the rear door is in its closed position. The cabinet comprises a first cabinet wall portion and a second cabinet wall portion parallel to and spaced from the first cabinet wall portion.

The storage unit also comprises a first drawer and a second drawer disposed in the cabinet directly below the first drawer. Both of the drawers are positioned within the cabinet between the first cabinet wall portion and the second cabinet wall portion with no other drawer disposed between them and the first and second cabinet wall portions.

Each of the drawers includes first and second drawer sidewalls that are parallel to each other, each of which has a length that is less than the second distance and each of which has an exterior surface and an interior surface. The interior surfaces of the drawer sidewalls face each other and are spaced apart by a distance that is not greater than the first distance.

The storage unit may further comprise a plurality of drawer support members that support the drawers so that the drawers are movable in a direction parallel to the length of the cabinet between an open position and a closed position and so that a portion of each of the drawers extends beyond the second vertical plane and outside of the space when the drawers are in their open position, when the storage unit is mounted to the vehicle, and when the rear door of the vehicle is in its open position.

The storage unit may also include a retention member that is connectable to the cabinet, the retention member being movable between a first position in which the drawers are prevented from being opened and a second position in which the retention member does not prevent the drawers from being opened.

The features and advantages of the present invention will be apparent to those of ordinary skill in the art in view of the detailed description of the preferred embodiments, which is made with reference to the drawings, a brief description of which is provided below.

BRIEF DESCRIPTION OF THE DRAWINGS

FIGS. 14–18 illustrate various mounting components of the storage unit of FIG. 5; and FIG. 19 is a bottom view of a portion of an alternative quick-release mechanism that could be used with the storage unit of FIG. 5.

DETAILED DESCRIPTION OF THE PREFERRED EMBODIMENTS

Figure 1:
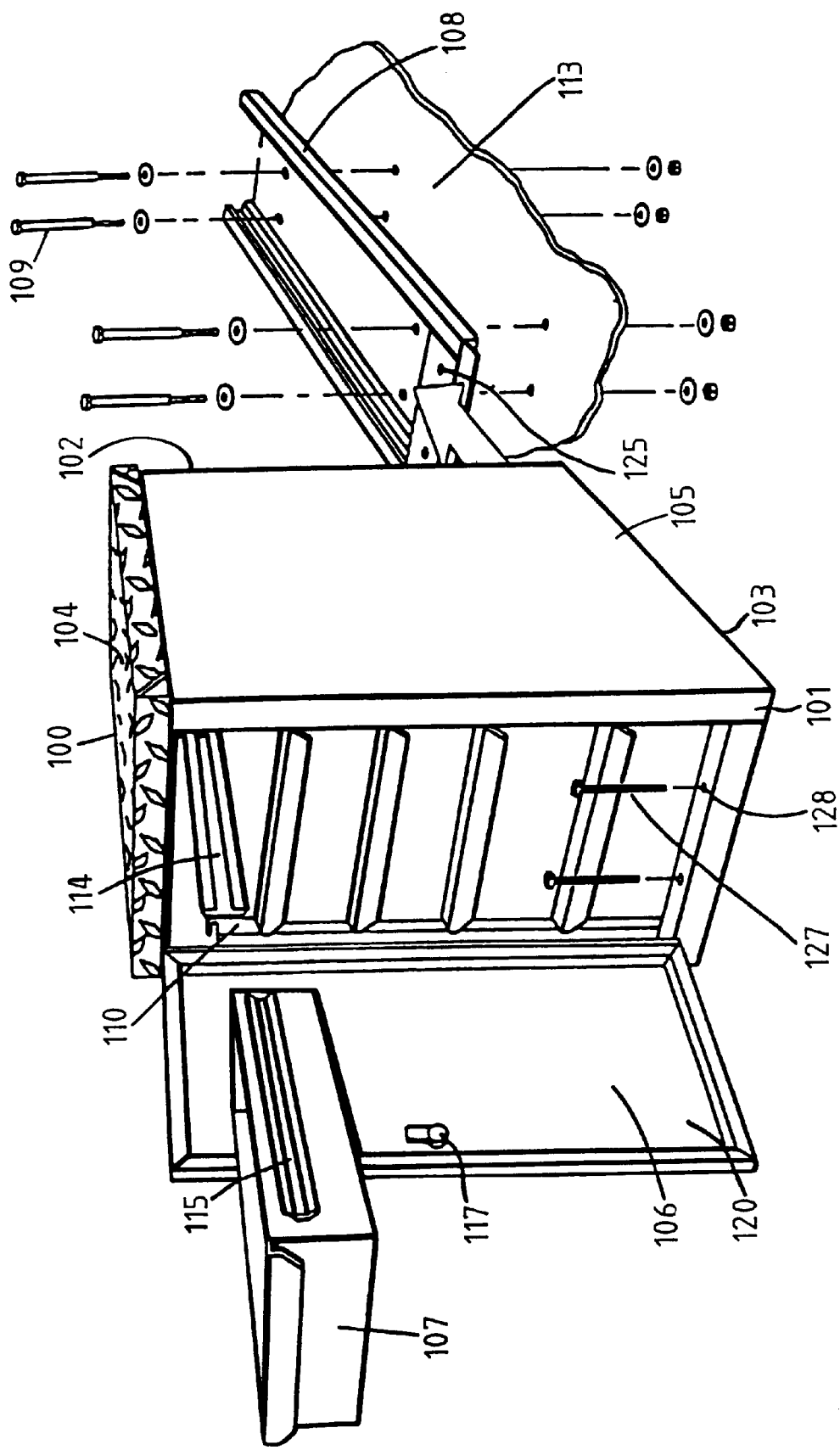
FIG. 1 is a perspective view of a first embodiment of a storage unit in accordance with the invention.
Figure 3:
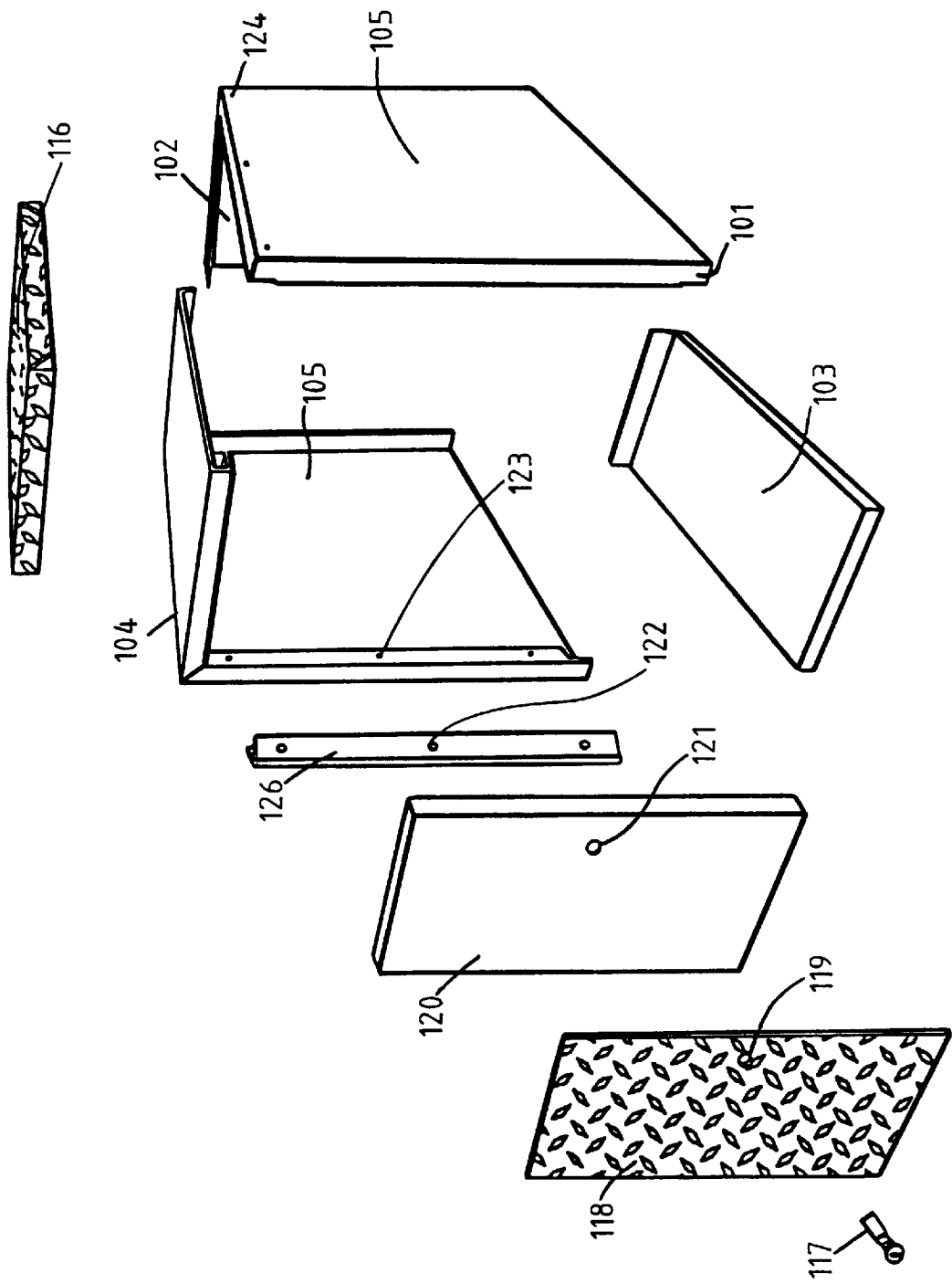
FIG. 3 is a fragmentary, perspective view of the cabinet of the storage unit of FIG. 1.

A storage unit 100 in accordance with one embodiment of the invention is shown in FIGS. 1 and 3. The storage unit 100 comprises a cabinet 106 having a front 101, a back 102, a bottom 103, a top 104 and two sides 105. A door 120 in the front 101 provides access to the contents of the cabinet. As shown in FIGS. 1 and 3, the door 120 is mounted at holes 122 to a continuous hinge 126, which is mounted at holes 123 to the cabinet 106. A cam lock 117 mounted in the door 120 allows the cabinet 106 to be locked, thereby securing the contents.

The cabinet 106 may be mounted to the cargo area of a vehicle by attaching it to a mounting bracket 108, as shown in FIG. 1. The mounting bracket 108 may be bolted 109 or otherwise firmly attached to the floor 113 of the cargo area so that the mounting bracket may not be quickly and easily removed. The cabinet 106 may then be secured to the mounting bracket 108 by screws 127, which extend through holes 128 in the cabinet into holes 125 in the mounting bracket. Holes 128 are located inside of cabinet 106 such that screws 127 may be inserted or removed only if door 120 is open. This mounting arrangement allows the cabinet 106 to be easily detached and removed from the vehicle by simply removing the screws 127, but deters theft by preventing removal of the cabinet 106 when the door 120 is closed and locked.

The storage unit may be made of any of a variety of materials. For example, the cabinet 106 may be made of sheet metal, and the top 104 and door 120 may be reinforced with aluminum tread plates 116 and 118. The lock 117 extends through the door 120, at hole 121, and through the aluminum tread plate 118, at hole 119. As shown in FIGS. 1 and 3, the panels are joined by rivets 124, but any known method may be used to join the panels. The top 104 and one side 105 may be formed from a single piece of material, and the back 102 and the second side 105 may be formed from a single piece of material. This construction reduces production costs and results in a stronger cabinet.

Figure 2:
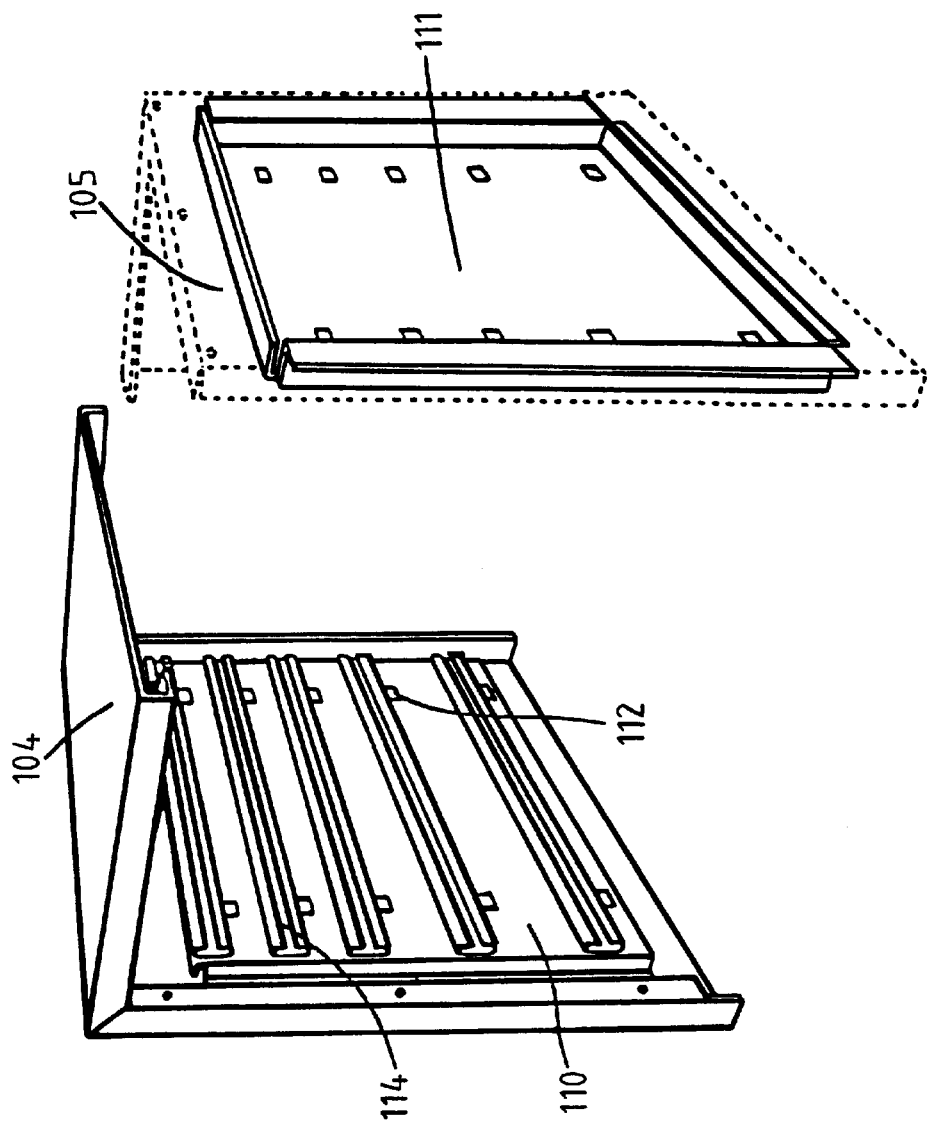
FIG. 2 is a fragmentary, perspective view of a portion of the interior of the cabinet of the storage unit of FIG. 1.

The interior of the cabinet 106 may be fitted with drawers 107 to provide easier access to the contents of the cabinet 106. As shown in FIGS. 1 and 2, to accommodate drawers 107, the interior of the cabinet 106 may be fitted with side walls 111. The side walls may comprise a drawer slide mounting assembly 110 having slide rails 114 on which the drawers 107 may slide, and locating shear forms 112 on which the slide rails 114 may be mounted. Corresponding slide rails 115 may then be mounted on the drawers 107. The slide rails 114 permit the drawers 107 to be fully extended or removed from the cabinet 106, as shown in FIG. 1, so that the entire length of each drawer may be used.

Figure 4:
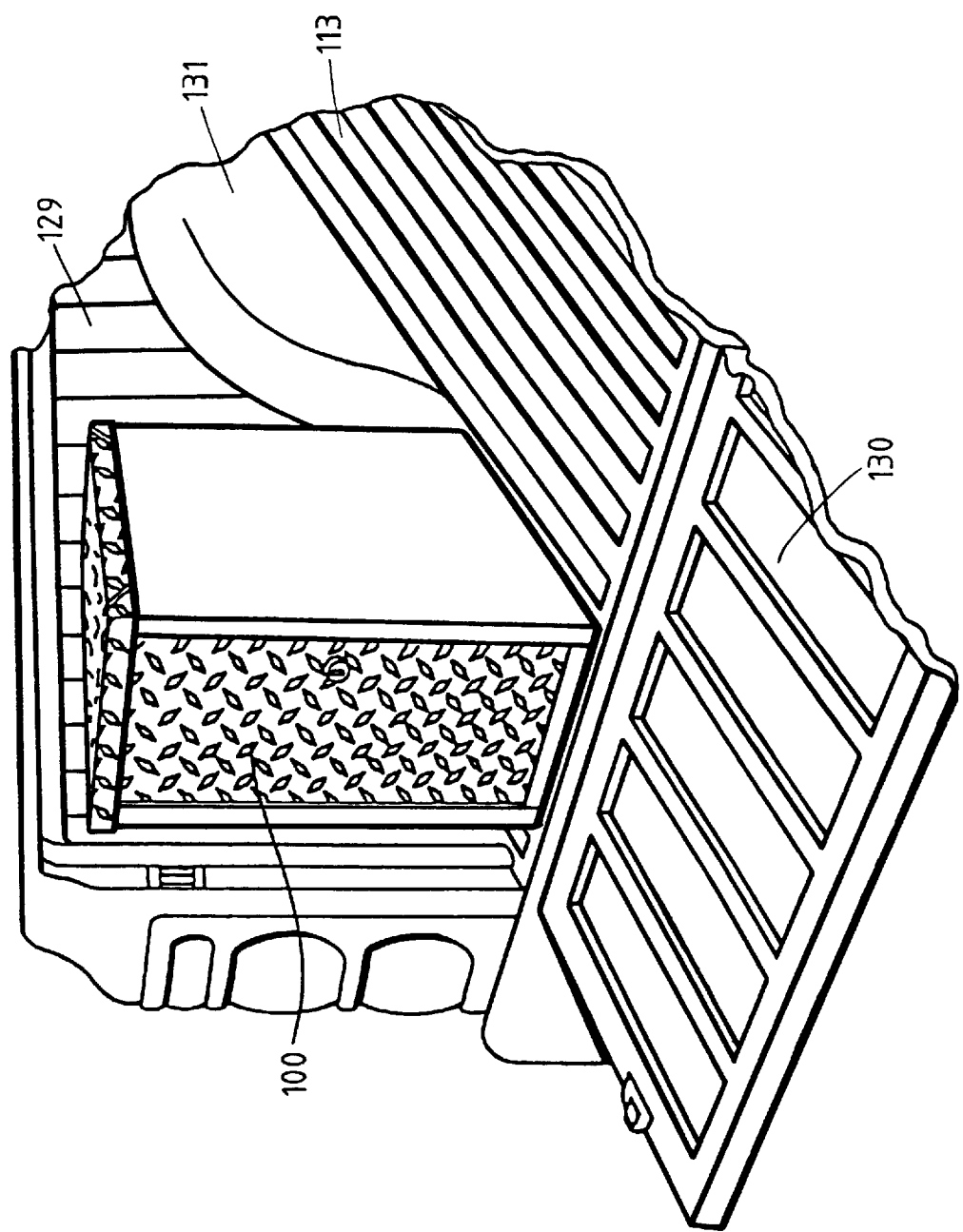
FIG. 4 is a perspective view of a vehicle in which the storage unit of FIG. 1 is installed.

The storage unit 100 may be mounted to the vehicle bed 113, as shown in FIG. 4, along the sidewall of the cargo area 129 behind the wheel well 131 and adjacent to the tailgate or rear 130 of the vehicle. In other types of vehicles, such as vans, the storage unit 100 may be mounted adjacent a rear or side door. These locations allow easy access to the contents of the storage unit, without reaching over the sidewall or climbing into the cargo area, and minimize interference with use of the cargo area for carrying cargo.

Figure 5:
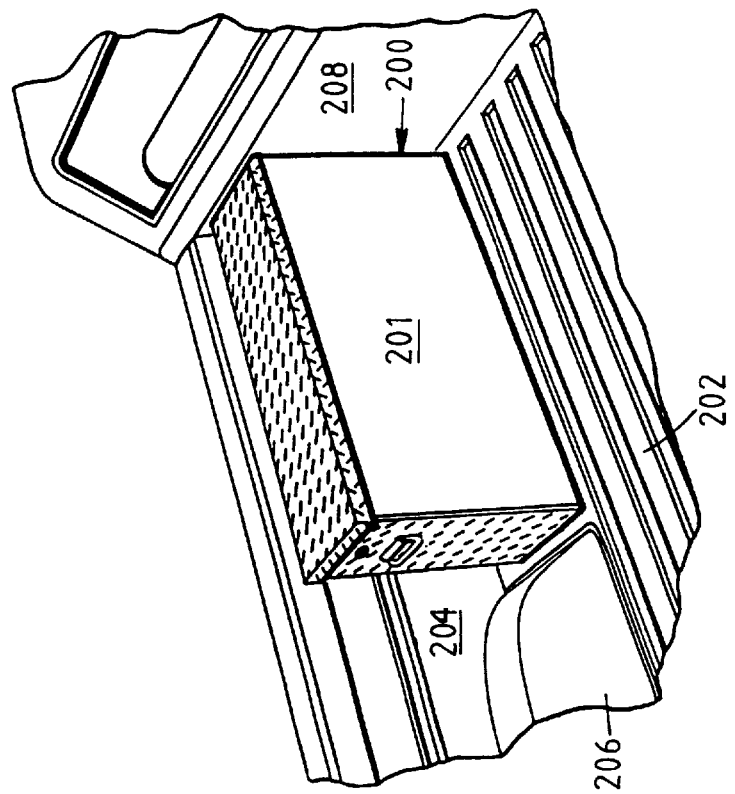
FIG. 5 is a perspective view of a second embodiment of a storage unit in accordance with the invention shown mounted in front of the wheel well of a pickup truck.

A second embodiment of a storage unit 200 in accordance with the invention is shown in FIGS. 5–17. As shown in FIG. 5, the storage unit 200 has a storage cabinet 201 that may be removably mounted to a floor portion 202 of a vehicle, such as a pickup truck, at a mounting location adjacent a sidewall 204 of the vehicle and located between a wheel well 206 of the vehicle and an interior wall surface 208 of the vehicle. The storage cabinet 201 has a width that is not greater than the distance between the sidewall 204 of the vehicle and the outer surface of the wheel well 206 so that when the storage unit 201 is mounted adjacent the sidewall 204, no portion of the storage cabinet 201 extends outwardly beyond the wheel well 206.

Figure 11:
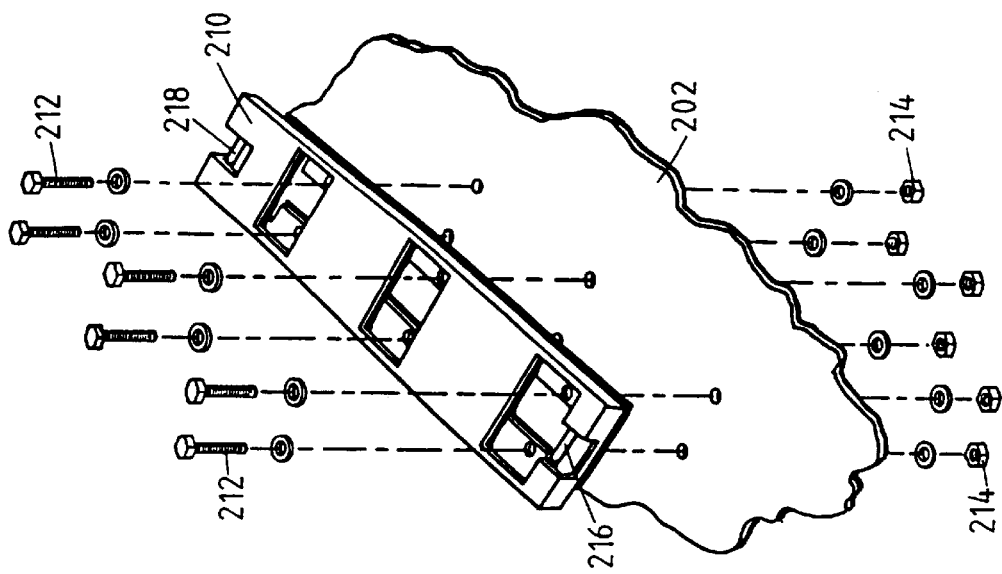
FIG. 11 is an exploded perspective view of how the mounting bracket mounts to the bed of the pickup truck.

The storage unit 201 is removably mounted to the floor portion 202 of the vehicle via a mounting bracket 210 that is fixed to the floor portion 202 of the vehicle. Referring to FIG. 11, the mounting bracket 210 may be fixed to the floor portion 202 of the vehicle in any suitable manner, such as by a plurality of bolts 212 and nuts 214. To facilitate the removable mounting of the storage cabinet 201 to the mounting bracket 210, the mounting bracket 210 has a first connecting rod 216 disposed adjacent one end of the mounting bracket 210 and a second connecting rod 218 disposed adjacent an opposite end of the mounting bracket 210.

Figure 8:
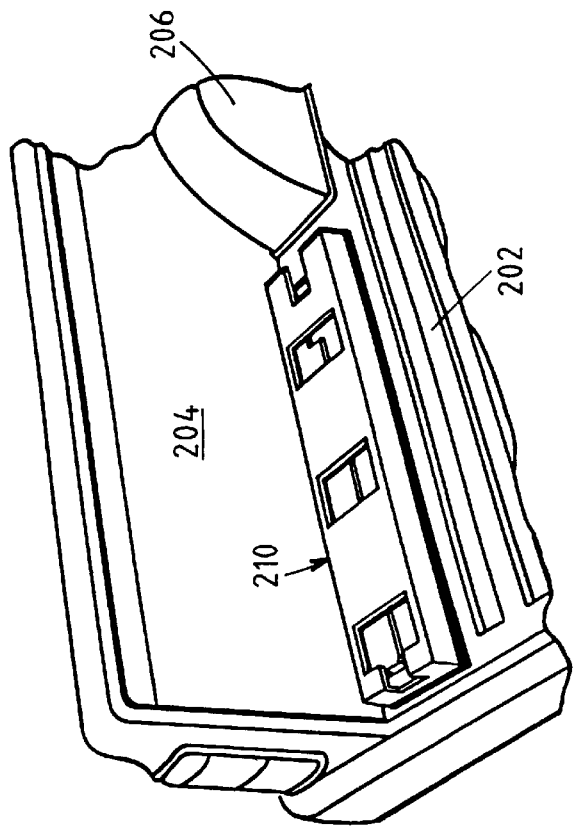
FIG. 8 is a perspective view of the mounting bracket shown mounted behind the wheel well of a pickup truck.
Figure 7:
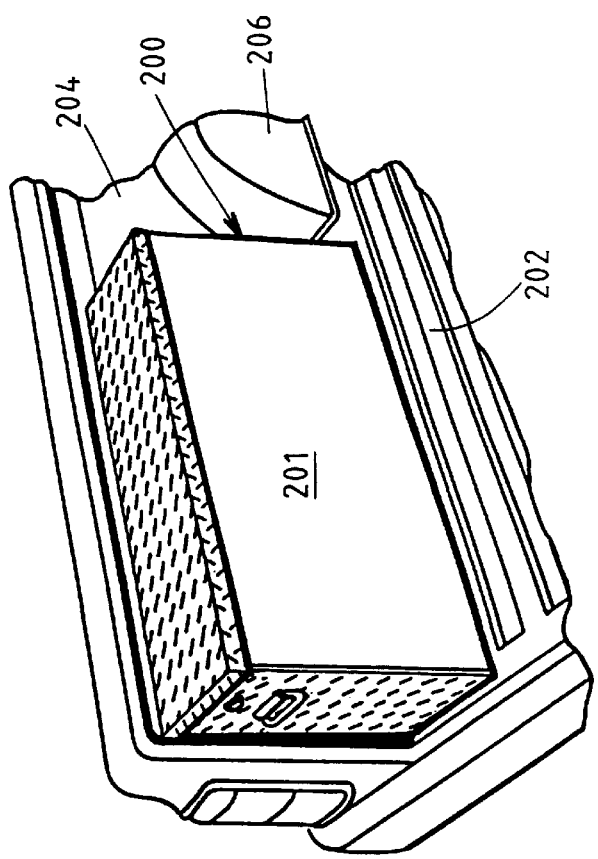
FIG. 7 is a perspective view of the storage unit of FIG. 5 shown mounted behind the wheel well of a pickup truck.

As shown in FIGS. 7–8, the storage cabinet 201 and the mounting bracket 210 may be mounted to the floor 202 of the vehicle at a point behind the wheel well 206, so that the storage cabinet 201 occupies the space adjacent the sidewall 204 of the vehicle and between the wheel well 206 and a rear door (not shown) of the vehicle. When mounted at this location, no portion of the storage cabinet 201 extends beyond the wheel well 206 of the vehicle.

The storage cabinet 201 may be provided with a height that does not exceed the height of the sidewall 204, and the storage cabinet 201 may be provided in different lengths so as to completely fill the space between the wheel well 206 and rear door of the vehicle, when mounted as shown in FIG. 7, or the space between the wheel well 206 and the internal wall 208 of the vehicle, when mounted as shown in FIG. 5.

Figure 10:
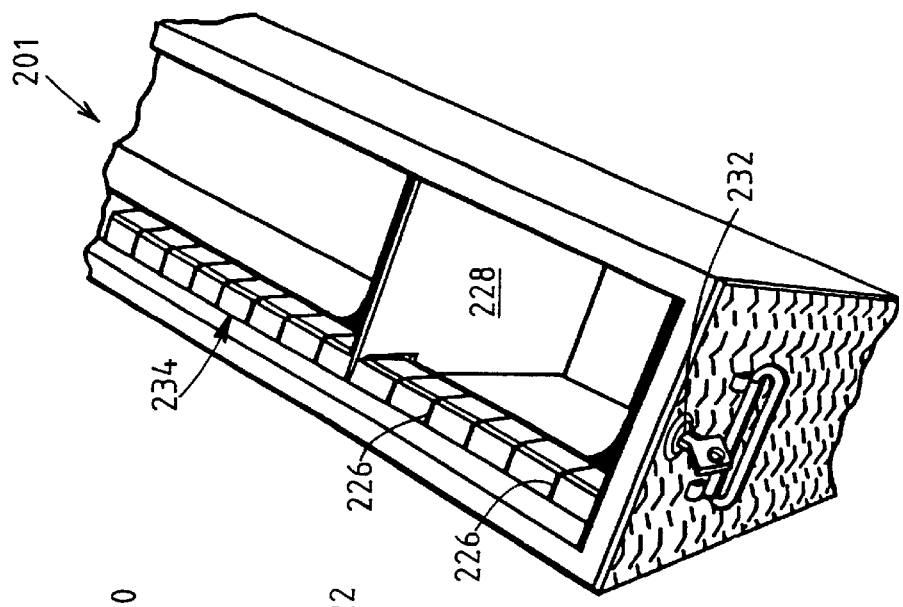
FIG. 10 is a perspective view of the interior of the storage unit of FIG. 5.
Figure 9:
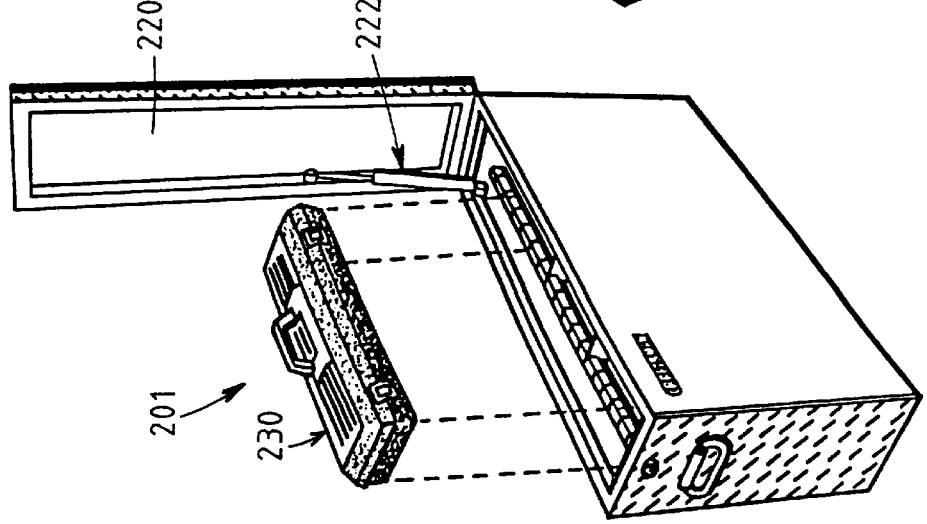
FIG. 9 is a perspective view of the storage unit of FIG. 5 with its lid open.

Referring to FIGS. 9–10, the storage cabinet 201 may have a hinged door 220. The opening and closing of the door 220 may be assisted by a damping assembly, such as a piston-and cylinder assembly 222. The interior of the storage cabinet 201 may have one or more guide rails 224 having a plurality of slots 226 formed therein, with each of the slots 226 being sized to receive a vertically disposed divider plate 228 for dividing the interior of the storage cabinet 201 into compartments of the desired size. The storage cabinet 201 may be provided with a separate utility box 230, which may be used to store relatively small items, that covers the interior of the storage cabinet 201 and over which the door 220 may be closed. The storage cabinet 201 may also have a lock 232 for locking the door 220 in place in its closed position.

Figure 13:
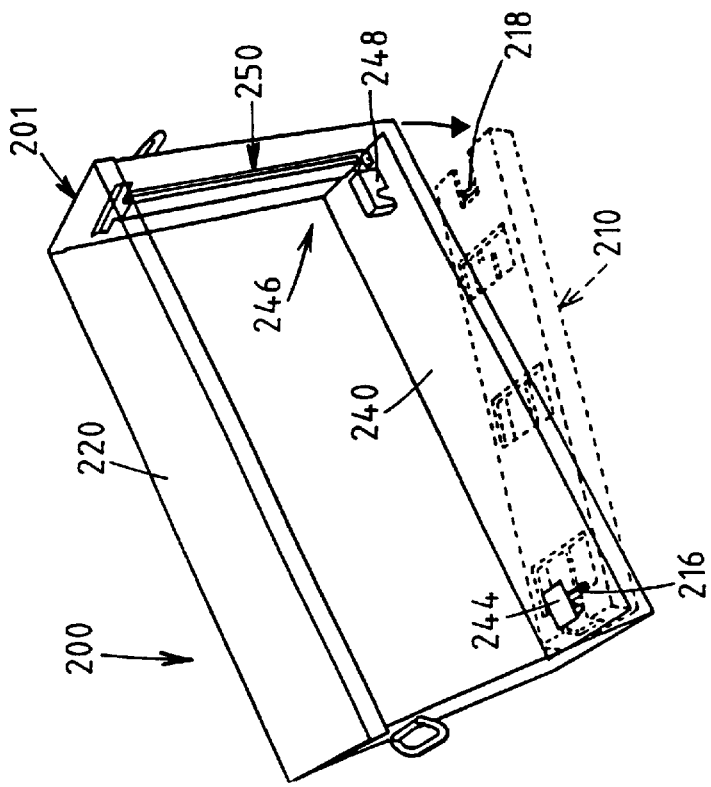
FIGS. 12 and 13 illustrate how the storage unit mounts to the mounting bracket.
Figure 12:
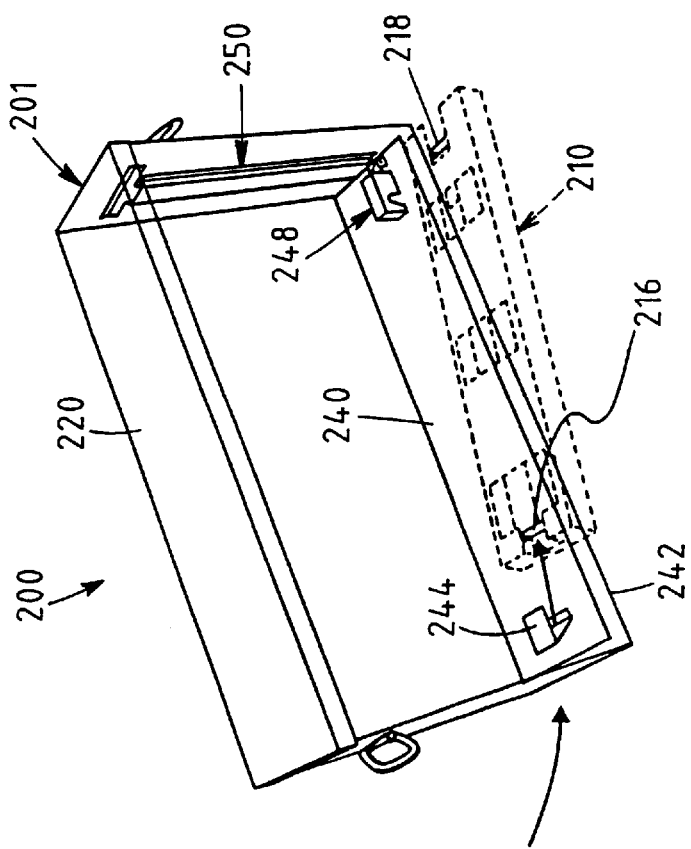

Referring to FIGS. 12–13, the storage cabinet 201 has a horizontally disposed bottom plate 240. As shown in FIG. 15, the bottom plate 240 is disposed at a higher elevation than a bottom rectangular edge 242 of the storage cabinet 201. A latch member in the form of a generally C-shaped latch 244 is mounted to the lower surface of the bottom plate 240, and a quick-release mechanism 246 is disposed in an interior portion of the storage cabinet 201.

The quick-release mechanism 246, which may be designed to allow the cabinet 201 to be mounted to the mounting bracket 210 and removed from the mounting bracket 210 without the use of a tool, such as a screwdriver or wrench, is composed of a latching mechanism 248 and an actuating mechanism 250 operatively coupled to the latching mechanism 248. The latching mechanism 248 is mounted to the underside of the bottom plate 240 adjacent one end of the storage cabinet 201, and the C-shaped latch 244 is mounted to the underside of the bottom plate 240 adjacent the opposite end of the storage cabinet 201.

As shown in FIG. 16, the actuating mechanism 250 may comprise a T-shaped actuator 252 that is slidably disposed within a guide member 254 fixed to an end wall of the storage cabinet 201. As shown in FIG. 17, the lower end of the actuator 252 may be connected to, or provided in the form of, a U-shaped connecting member 256. The U-shaped connecting member 256 may be connected to a release arm 258 of the latching member 248 via a bolt 260, with the release arm 258 being pivotally connected to the latching mechanism 248 via a rod 262. The release arm 258 may be spring-biased via a torsion spring (not shown) wrapped around the rod 262.

Referring to FIGS. 17–18, the latching mechanism 248 has a housing 264 and a U-shaped latching member 266 which is pivotally connected to the housing 264 via a rod 268. The U-shaped latching member 266 is sized and adapted to receive the connecting rod 218 fixed to the mounting bracket 210. The U-shaped latching member 266 may be spring-biased via a torsion spring (not shown) wrapped around the rod 268.

The U-shaped latching member 266 is operatively coupled to the release arm 258 in the manner described below. When the latching member 266 is pivoted from an unlocked position as shown in FIG. 17 to a locked position as shown in FIG. 18, the release arm 258 is caused to move from a raised position as shown in FIG. 17 to a lowered position as shown in FIG. 18. The U-shaped latching member 266 will remain in its locked position, as shown in FIG. 18, until the release arm 258 is forced to its raised position, as shown in FIG. 17, at which point the latching member 266 will be caused to move to its unlocked position.

Figure 6:
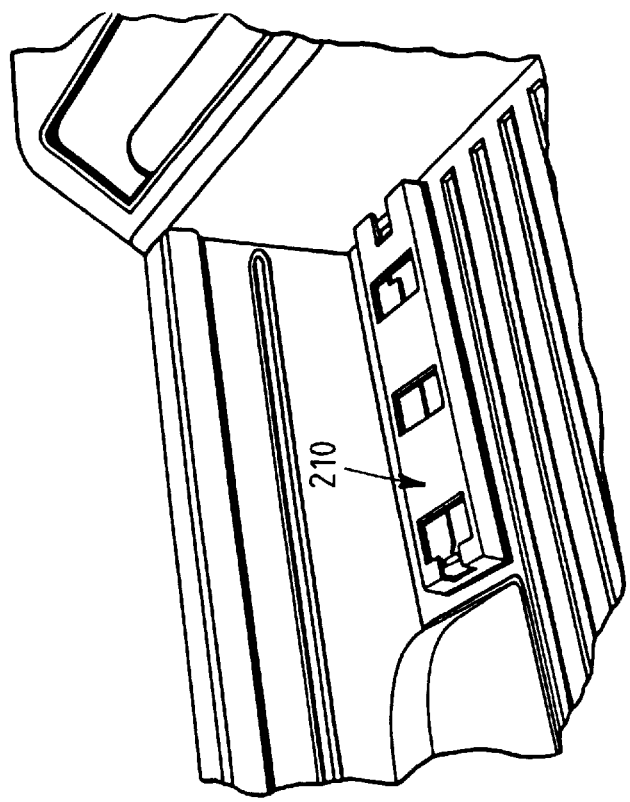
FIG. 6 is a perspective view of a mounting bracket of the storage unit of FIG. 5 shown mounted in front of the wheel well of a pickup truck.

After the mounting bracket 210 is mounted to a desired position, as shown in FIGS. 6 and 8 for example, the storage cabinet 201 may be mounted to the mounting bracket 210. In order to accomplish such mounting, the end of the storage cabinet 201 is moved horizontally relative to the mounting bracket 210, as shown in FIG. 12, until the connecting rod 216 fixed to the mounting bracket 210 is captured within the C-shaped latch 244 fixed to the underside of the storage cabinet 201. Then (with the latch mechanism 248 in its unlocked position as shown in FIG. 17) the opposite end of the storage cabinet 201 may be lowered, with the latching mechanism 248 above the connecting rod 218, until the connecting rod 218 is received within the U-shaped member 266 of the latching mechanism 248. Further downward movement of the storage cabinet 201 will cause the connecting rod 218 to force the latching mechanism 218 from its unlocked position, as shown in FIG. 17, to its locked position, as shown in FIG. 18.

The storage cabinet 201 may be removed from the mounting bracket 210 by pulling up on the actuator 252, which will cause the release arm 258 to pivot upwardly, which in turn will cause the U-shaped latch to move from its locked position as shown in FIG. 18 to its unlocked position as shown in FIG. 17, thus allowing the end of the storage cabinet 201 to be lifted off of the mounting bracket 210, and then slid so that the connecting rod 216 is no longer disposed within the C-shaped latch 244.

The lock 232 (FIG. 10) effectively prevents or deters theft of the storage cabinet 201 since the only way to release the storage cabinet 201 from the mounting bracket 210 is to pull up the actuator 252 and since the actuator 252 is disposed within the locked interior of the storage cabinet 201.

The latching mechanism 248 shown in FIGS. 17 and 18 and described above is a conventional device that is commercially available from Eberhard Manufacturing Co. Although a specific latching mechanism has been described above, the particular type of latching mechanism used is not considered important to the invention, and any type of latching mechanism could be used.

Referring to FIG. 19, which is a bottom view of a portion of the mounting bracket 210 and a portion of an alternative quick-release mechanism, the alternative quick-release mechanism could be provided in the form of a rotatable rod having an upper end (which could be L-shaped, for example) located at a position generally coinciding with the T-shaped top of the actuator 252 and an L-shaped lower end 280 which is selectively rotatable relative to a slot 282 formed in the mounting bracket 210. When the L-shaped lower end 280 is rotated to its position shown in FIG. 19, in which the lower end 280 is not aligned with the slot 282 in the mounting bracket 210, removal of the storage cabinet 201 (to which the rotatable rod is fixed) from the mounting bracket 210 would be prevented. When the rotatable rod is aligned with the slot 282, so that its lower end 280 may pass through the slot 282, the rotatable rod and the storage cabinet 201 to which it is connected may be removed from the mounting bracket 210.

To prevent the rotatable rod from being inadvertently moved to its unlocked position, the rotatable rod could be spring-biased upwardly, and an upwardly extending groove or indentation (not shown) could be formed in the plate in which the slot 282 is formed, to cause the lower end 280 to become seated within the groove when in the locked position, so that rod could only be rotated by simultaneously pressing down and rotating the rod.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A vehicle mounted storage unit mounted to a rear floor portion of a vehicle having a vehicle sidewall, a wheel well having a portion which extends outwardly from a portion of said sidewall by a first distance in a first direction, and a rear vehicle door that is movable between a closed position and an open position, said rear vehicle door being spaced from a rear portion of said wheel well by a second distance in a second direction perpendicular to said first direction and parallel to said vehicle sidewall, said vehicle mounted storage unit comprising:

a cabinet having a bottom portion mounted to said rear floor portion of said vehicle between a first line coinciding with a rear portion of said wheel well and extending in said first direction and a second line extending in said first direction and coinciding with an interior portion of said rear vehicle door when said rear vehicle door is in its closed position, with no portion of said cabinet extending outside of a space bored by a horizontal plane coinciding with said floor portion of said vehicle, a first vertical plane coinciding with said rear portion of said wheel well, and a second vertical plane coinciding with said interior portion of said rear door when said rear door is in its closed position, said cabinet not extending over said sidewall of said vehicle, said cabinet having a width, a length greater than said width and a depth, said cabinet comprising:

a first exterior cabinet wall portion;

a second exterior cabinet wall portion spaced from said first exterior cabinet wall portion in a direction parallel to said width of said cabinet;

a first interior cabinet wall portion parallel to said first exterior cabinet wall portion, said first interior cabinet wall portion being spaced from said first exterior cabinet wall portion in a direction parallel to said width of said cabinet; and a second interior cabinet wall portion parallel to said second exterior cabinet wall portion, said second interior cabinet wall portion being spaced from said second exterior cabinet wall portion in a direction parallel to said width of said cabinet;

at least one connecting member that attaches said cabinet to said rear floor portion of said vehicle at a mounting point between said first line and said second line;

a first drawer disposed in said cabinet, said first drawer being positioned within said cabinet between said first interior cabinet wall portion and said second interior cabinet wall portion with no other drawer disposed between said first interior cabinet wall portion and said first drawer and with no other drawer disposed between said second interior cabinet wall portion and said first drawer, said first drawer comprising:

a first drawer sidewall having a length that is less than said second distance, said first drawer sidewall of said first drawer having an exterior surface and an interior surface;

a second drawer sidewall having a length that is less than said second distance, said second drawer sidewall of said first drawer being parallel to said first drawer sidewall of said first drawer, and said second drawer sidewall of said first drawer having an exterior surface and an interior surface, and said interior surface of said first drawer sidewall of said first drawer facing said interior surface of said second drawer sidewall of said first drawer, said interior surface of said first drawer sidewall of said first drawer being spaced from said interior surface of said second drawer sidewall of said first drawer by a distance that is not greater than said first distance;

at least one first drawer support member that supports said first drawer, said first drawer support member supporting said first drawer so that said first drawer is movable in a direction parallel to said length of said cabinet between an open position and a closed position, a portion of said first drawer extending beyond said second vertical plane and outside of said space when said first drawer is in its open position and when said rear door of said vehicle is in its open position;

a second drawer disposed in said cabinet, said second drawer being positioned within said cabinet between said first interior cabinet wall portion and said second interior cabinet wall portion with no other drawer disposed between said first interior cabinet wall portion and said second drawer and with no other drawer disposed between said second interior cabinet wall portion and said second drawer, said cabinet not having any drawer disposed therein that has a length greater than said second distance, said second drawer comprising:

a first drawer sidewall having a length that is less than said second distance, said first drawer sidewall of said second drawer having an exterior surface and an interior surface;

a second drawer sidewall having a length that is less than said second distance, said second drawer sidewall of said second drawer being parallel to said first drawer sidewall of said second drawer, and said second drawer sidewall of said second drawer having an exterior surface and an interior surface, and said interior surface of said first drawer sidewall of said second drawer facing said interior surface of said second drawer sidewall of said second drawer, said interior surface of said first drawer sidewall of said second drawer being spaced from said interior surface of said second drawer sidewall of said second drawer by a distance that is not greater than said first distance; and at least one second drawer support member that supports said second drawer, said second drawer support member supporting said second drawer so that said second drawer is movable in a direction parallel to said length of said cabinet between an open position and a closed position, a portion of said second drawer extending beyond said second vertical plane and outside of said space when said second drawer is in its open position and when said rear door of said vehicle is in its open position.

2. A vehicle mounted storage unit as defined in claim 1 additionally comprising a retention member that is connectable to said cabinet, said retention member being movable between a first position in which said retention member prevents said first and second drawers from being opened and a second position in which said retention member does not prevent said first and second drawers from being opened.

3. A vehicle mounted storage unit as defined in claim 2 additionally comprising a lock associated with said retention member, said lock allowing said retention member to be locked in said first position in which said first and second drawers are prevented from being opened.

4. A vehicle mounted storage unit as defined in claim 1 wherein said retention member comprises a door that is pivotally connected to said cabinet via a hinge.

5. A vehicle mounted storage unit as defined in claim 1 additionally comprising a mounting bracket fixed to said rear floor portion of said vehicle, said mounting bracket having a length that is less than said second distance, said mount bracket being fixed to said rear floor portion of said vehicle at a mounting point between said first line and said second line, said cabinet being attachable to said mounting bracket and removable from said mounting bracket.

6. A vehicle mounted storage unit mounted to a rear floor portion of a vehicle having a vehicle sidewall, a wheel well having a portion which extends outwardly from a portion of said sidewall by a first distance in a first direction, and a rear vehicle door that is movable between a closed position and an open position, said rear vehicle door being spaced from a rear portion of said wheel well by a second distance in a second direction perpendicular to said first direction and parallel to said vehicle sidewall, said vehicle mounted storage unit, comprising:

a cabinet having a bottom portion mounted to said rear floor portion of said vehicle between a first line coinciding with a rear portion of said wheel well and extending in said first direction and a second line extending in said first direction and coinciding with an interior portion of said rear vehicle door when said rear vehicle door is in its closed position, no portion of said cabinet extending beyond a vertical plane coinciding with said interior portion of said rear door when said rear door is in its closed position, said cabinet not extending over said sidewall of said vehicle, said cabinet having a width, a length greater than said width and a depth, said cabinet comprising a first cabinet wall portion and a second cabinet wall portion spaced from said first cabin wall portion in a direction parallel to said width of said cabinet;

at least one connecting member that attaches said cabinet to said rear floor portion of said vehicle at a mounting point between said first line and said second line;

a first drawer disposed in said cabinet, said first drawer being positioned within said cabinet between said first cabinet wall portion and said second cabinet wall portion with no other drawer disposed between said first cabinet wall portion and said first drawer and with no other drawer disposed between said second cabinet wall portion and said first drawer, said first drawer comprising:

a first drawer sidewall having a length that is less than said second distance, said first drawer sidewall of said first drawer having an exterior surface and an interior surface;

a second drawer sidewall having a length that is less than said second distance, said second drawer sidewall of said first drawer being parallel to said first drawer sidewall of said first drawer, and said second drawer sidewall of said first drawer having an exterior surface and an interior surface, and said interior surface of said first drawer sidewall of said first drawer facing said interior surface of said second drawer sidewall of said first drawer, said interior surface of said first drawer sidewall of said first drawer being spaced from said interior surface of said second drawer sidewall of said first drawer by a distance that is not greater than said first distance;

at least one first drawer support member that supports said first drawer, said first drawer support member supporting said first drawer so that said first drawer is movable in a direction parallel to said length of said cabinet between an open position and a closed position, a portion of said first drawer extending beyond said vertical plane when said first drawer is in its open position and when said rear door of said vehicle is in its open position;

a second drawer disposed in said cabinet, said second drawer being positioned within said cabinet between said first cabinet wall portion and said second cabinet wall portion with no other drawer disposed between said first cabinet wall portion and said second drawer and with no other drawer disposed between said second cabinet wall portion and said second drawer, said second drawer comprising:

a first drawer sidewall having a length that is less than said second distance, said first drawer sidewall of said second drawer having an exterior surface and an interior surface;

a second drawer sidewall having a length that is less than said second distance, said second drawer sidewall of said second drawer being parallel to said first drawer sidewall of said second drawer, and said second drawer sidewall of said second drawer having an exterior surface and an interior surface, and said interior surface of said first drawer sidewall of said second drawer facing said interior surface of said second drawer sidewall of said second drawer, said interior surface of said first drawer sidewall of said second drawer being spaced from said interior surface of said second drawer sidewall of said second drawer by a distance that is not greater than said first distance; and at least one second drawer support member that supports said second drawer, said second drawer support member supporting said second drawer so that said second drawer is movable in a direction parallel to said length of said cabinet between an open position and a closed position, a portion of said second drawer extending beyond said vertical plane when said second drawer is in its open position and when said rear door of said vehicle is in its open position.

7. A vehicle mounted storage unit as defined in claim 6 additionally comprising a retention member that is connectable to said cabinet, said retention member being movable between a first position in which said retention member prevents said first and second drawers from being opened and a second position in which said retention member does not prevent said first and second drawers from being opened.

8. A vehicle mounted storage unit as defined in claim 7 additionally comprising a lock associated with said retention member, said lock allowing said retention member to be locked in said first position in which said first and second drawers are prevented from being opened.

9. A vehicle mounted storage unit as defined in claim 6 wherein said retention member comprises a door that is pivotally connected to said cabinet via a hinge.

10. A vehicle mounted storage unit as defined in claim 6 additionally comprising a mounting bracket fixed to said rear floor portion of said vehicle, said mounting bracket having a length that is less than said second distance, said mounting bracket being fixed to said rear floor portion of said vehicle at a mounting point between said first line and said second line, said cabinet being attachable to said mounting bracket and removable from said mounting bracket.

11. A vehicle mounted storage unit as defined in claim 6 wherein said cabinet comprises:

a first exterior cabinet wall portion;

a second exterior cabinet wall portion spaced from said first exterior cabinet wall portion in a direction parallel to said width of said cabinet;

a first interior cabinet wall portion parallel to said first exterior cabinet wall portion, said first interior cabinet wall portion being spaced from said first exterior cabinet wall portion in a direction parallel to said width of said cabinet; and a second interior cabinet wall portion parallel to said second exterior cabinet wall portion, said second interior cabinet wall portion being spaced from said second exterior cabinet wall portion in a direction parallel to said width of said cabinet.

12. A vehicle mounted storage unit mounted to a rear floor portion of a vehicle having a vehicle sidewall, a wheel well having a portion which extends outwardly from a portion of said sidewall by a first distance in a first direction, and a rear vehicle door that is movable between a closed position and an open position, said rear vehicle door being spaced from a rear portion of said wheel well by a second distance in a second direction perpendicular to said first direction and parallel to said vehicle sidewall, said vehicle mounted storage unit comprising:

a cabinet having a bottom portion mounted to said rear floor portion of said vehicle between a first line coinciding with a rear portion of said wheel well and extending in said first direction and a second line extending in said first direction and coinciding with an interior portion of said rear vehicle door when said rear vehicle door is in its closed position, no portion of said cabinet extending beyond a vertical plane coinciding with said interior portion of said rear door when said rear door is in its closed position, said cabinet not extending over said sidewall of said vehicle, said cabinet having a width, a length greater than said width and a depth, said cabinet comprising a first cabinet wall portion and a second cabinet wall portion spaced from said first cabinet wall portion in a direction parallel to said width of said cabinet;

at least one connecting member that attaches said cabinet to said rear floor portion of said vehicle at a mounting point between said first line and said second line;

a first drawer disposed in said cabinet, said first drawer being positioned within said cabinet between said first cabinet wall portion and said second cabinet wall portion with no other drawer disposed between said first cabinet wall portion and said first drawer and with no other drawer disposed between said second cabinet wall portion and said first drawer, said first drawer comprising:

a first drawer sidewall having a length that is less than said second distance, said first drawer sidewall of said first drawer having an exterior surface and an interior surface;

a second drawer sidewall having a length that is less than said second distance, said second drawer sidewall of said first drawer being parallel to said first drawer sidewall of said first drawer, and said second drawer sidewall of said first drawer having an exterior surface and an interior surface, and said interior surface of said first drawer sidewall of said first drawer facing said interior surface of said second drawer sidewall of said first drawer, said interior surface of said first drawer sidewall of said first drawer being spaced from said interior surface of said second drawer sidewall of said first drawer by a distance that is not greater than said first distance;

at least one first drawer support member that supports said first drawer, said first drawer support member supporting said first drawer so that said first drawer is movable in a direction parallel to said length of said cabinet between an open position and a closed position, a portion of said first drawer extending beyond said vertical plane when said first drawer is in its open position and when said rear door of said vehicle is in its open position;

a second drawer disposed in said cabinet, said second drawer being positioned within said cabinet between said first cabinet wall portion and said second cabinet wall portion with no other drawer disposed between said first cabinet wall portion and said second drawer and with no other drawer disposed between said second cabinet wall portion and said second drawer, said cabinet not having any drawer disposed therein that has a length greater than said second distance, said second drawer comprising:

a first drawer sidewall having a length that is less than said second distance, said first drawer sidewall of said second drawer having an exterior surface and an interior surface;

a second drawer sidewall having a length that is less than said second distance, said second drawer sidewall of said second drawer being parallel to said first drawer sidewall of said second drawer, and said second drawer sidewall of said second drawer having an exterior surface and an interior surface, and said interior surface of said first drawer sidewall of said second drawer facing said interior surface of said second drawer sidewall of said second drawer, said interior surface of said first drawer sidewall of said second drawer being spaced from said into surface of said second drawer sidewall of said second drawer by a distance that is no greater than said first distance; and at least one second drawer support member that supports said second drawer, said second drawer support member supporting said second drawer so that said second drawer is movable in a direction parallel to said length of said cabinet between an open position and a closed position, a portion of said second drawer extending beyond said vertical plane when said second drawer is in its open position and when said rear door of said vehicle is in its open position.

13. A vehicle mounted storage unit as defined in claim 12 additionally comprising a retention member that is connectable to said cabinet, said retention member being movable between a first position in which said retention member prevents said first and second drawers from being opened and a second position in which said retention member does not prevent said first and second drawers from being opened.

14. A vehicle mounted storage unit as defined in claim 13 additionally comprising a lock associated with said retention member, said lock allowing said retention member to be locked in said first position in which said first and second drawers are prevented from being opened.

15. A vehicle mounted storage unit as defined in claim 12 wherein said retention member comprises a door that is pivotally connected to said cabinet via a hinge.

16. A vehicle mounted storage unit as defined in claim 12 additionally comprising a mounting bracket fixed to said rear floor portion of said vehicle, said mounting bracket having a length that is less than said second distance, said mounting bracket being fixed to said rear floor portion of said vehicle at a mounting point between said first line and said second line, said cabinet being attachable to said mounting bracket and removable from said mounting bracket.

17. A vehicle mounted storage unit as defined in claim 12 wherein said cabinet comprises:

a first exterior cabinet wall portion;

a second exterior cabinet wall portion spaced from said first exterior cabinet wall portion in a direction parallel to said width of said cabinet;

a first interior cabinet wall portion parallel to said first exterior cabinet wall portion, said first interior cabinet wall portion being spaced from said first exterior cabinet wall portion in a direction parallel to said width of said cabinet; and a second interior cabinet wall portion parallel to said second exterior cabinet wall portion, said second interior cabinet wall portion being spaced from said second exterior cabinet wall portion in a direction parallel to said width of said cabinet.

18. A storage unit sized to be capable of being mounted to a rear floor portion of a vehicle having a vehicle sidewall, a wheel well having a portion which extends outwardly from a portion of said sidewall by a first distance in a first direction, and a rear vehicle door that is movable between a closed position and an open position, said rear vehicle door being spaced from a rear portion of said wheel well by a second distance in a second direction perpendicular to said first direction and parallel to said vehicle sidewall, said storage unit comprising:

a cabinet having a bottom portion capable of being mounted to said rear floor portion of said vehicle between a first line coinciding with a rear portion of said wheel well and extending in said first direction and a second line extending in said first direction and coinciding with an interior portion of sad rear vehicle door if said rear vehicle door were in its closed position, said cabinet being shaped such that no portion of said cabinet would extend outside of a space bounded by a horizontal plane coinciding with said floor portion of said vehicle, a first vertical plane coinciding with said rear portion of said wheel well, and a second vertical plane coinciding with said interior portion of said rear door if said storage unit were mounted to said vehicle and if said rear door were in its closed position, and such that said cabinet would not extend over said sidewall of said vehicle if said storage unit were mounted to said vehicle, said cabinet having a width, a length greater than said width and a depth, said cabinet comprising:

a first exterior cabinet wall portion;

a second exterior cabinet wall portion spaced from said first exterior cabinet wall portion in a direction parallel to said width of said cabinet;

a first interior cabinet wall portion parallel to said first exterior cabinet wall portion, said first interior cabinet wall portion being spaced from said first exterior cabinet wall portion in a direction parallel to said width of said cabinet; and a second interior cabinet wall portion parallel to said second exterior cabinet wall portion, said second interior cabinet wall portion being spaced from said second exterior cabinet wall portion in a direction parallel to said width of said cabinet;

a first drawer disposed in said cabinet, said first drawer being positioned within said cabinet between said first interior cabinet wall portion and said second interior cabinet wall portion with no other drawer disposed between said first interior cabinet wall portion and said first drawer and wall no other drawer disposed between said second interior cabinet wall portion and said first drawer, said first drawer comprising:

a first drawer sidewall hang a length that is less than said second distance, said first drawer sidewall of said first drawer having an exterior surface and an interior surface;

a second drawer sidewall having a length that is less than said second distance, said second drawer sidewall of said first drawer being parallel to said first drawer sidewall of said first drawer, and said second drawer sidewall of said first drawer having an exterior surface and an interior surface, and said interior surface of said first drawer sidewall of said first drawer facing said interior surface of said second drawer sidewall of said first drawer, said interior surface of said first drawer sidewall of said first drawer being spaced from said interior surface of said second drawer sidewall of said first drawer by a distance that is not greater than said first distance;

at least one first drawer support member that supports said first drawer, said first drawer support member supporting said first drawer so that said first drawer is movable in a direction parallel to said length of said cabinet between an open position and a closed position, said first drawer support member supporting said first drawer so that a portion of said first drawer would extend beyond said second vertical plane and outside of said space if said storage unit were mounted to said vehicle, if said first drawer were in its open position, and if said rear door of said vehicle were in its open position;

a second drawer disposed in said cabinet, said second drawer being positioned within said cabinet between said first interior cabinet wall portion and said second interior cabinet wall portion with no other drawer disposed between said first interior cabinet wall portion and said second drawer and with no other drawer disposed between said second interior cabinet wall portion and said second drawer, said cabinet not having any drawer disposed therein that has a length greater than said second distance, said second drawer comprising:

a first drawer sidewall having a length that is less than said second distance, said first drawer sidewall of said second drawer having an exterior surface and an interior surface;

a second drawer sidewall having a length that is less than said second distance, said second drawer sidewall of said second drawer being parallel to said first drawer sidewall of said second drawer, and said second drawer sidewall of said second drawer having an exterior surface and an interior surface, and said interior surface of said first drawer sidewall of said second drawer facing said interior surface of said second drawer sidewall of said second drawer, said interior surface of said first drawer sidewall of said second drawer being spaced from said interior surface of said second drawer sidewall of said second drawer by a distance that is not greater than said first distance; and at least one second drawer support member that supports said second drawer, said second drawer support member supporting said second drawer so that said second drawer is movable in a direction parallel to said length of said cabinet between an open position and a closed position, said second drawer support member supporting said second drawer so that a portion of said second drawer would extend beyond said second vertical plane and outside of said space if said storage unit were mounted to said vehicle, if said second drawer were in its open position, and if said rear door of said vehicle were in its open position.

19. A storage unit as defined in claim 18 additionally comprising a retention member that is connectable to said cabinet, said retention member being movable between a first position in which said retention member prevents said first and second drawers from being opened and a second position in which said retention member does not prevent said first and second drawers from being opened.

20. A storage unit as defined in claim 19 additionally comprising a lock associated with said retention member, said lock allowing said retention member to be locked in said first position in which said first and second drawers are prevented from being opened.

21. A storage unit as defined in claim 18 additionally comprising a mounting bracket that is capable of being fixed to said rear floor portion of said vehicle, said mounting bracket having a length that is less than said second distance, said cabinet being attachable to said mounting bracket and removable from said mounting bracket.

22. A storage unit sized to be capable of being mounted to a rear floor portion of a vehicle having a vehicle sidewall, a wheel well having a portion which extends outwardly from a portion of said sidewall by a first distance in a first direction, and a rear vehicle door that is movable between a closed position and an open position, said tear vehicle door being spaced from a rear portion of said wheel well by a second distance in a second direction perpendicular to said first direction and parallel to said vehicle sidewall, said storage unit comprising:

a cabinet having a bottom portion that is capable of being mounted to said rear floor portion of said vehicle between a first line coinciding with a rear portion of said wheel well and a second line coinciding with an interior portion of said rear vehicle door if said rear vehicle door were in its closed position, said cabinet being shaped so that no portion of said cabinet would extend beyond a vertical plane coinciding with said interior portion of said rear door if said storage unit were mounted to said vehicle and if said rear door were in its closed position and so that said cabinet would not extend over said sidewall of said vehicle it said storage unit were mounted to said vehicle, said cabinet having a width, a length greater than said width and a depth, said cabinet comprising a first cabinet wall portion and a second cabinet wall portion spaced from said first cabinet wall portion in a direction parallel to said width of said cabinet;

a first drawer disposed in said cabinet, said first drawer being positioned within said cabinet between said first cabinet wall portion and said second cabinet wall portion with no other drawer disposed between said first cabinet wall portion and said first drawer and with no other drawer disposed between said second cabinet wall portion and said first drawer, said first drawer comprising:

a first drawer sidewall having a length that is less than said second distance, said first drawer sidewall of said first drawer having an exterior surface and an interior surface;

a second drawer sidewall having a length that is less than said second distance, said second drawer sidewall of said first drawer being parallel to said first drawer sidewall of said first drawer, and said second drawer sidewall of said first drawer having an exterior surface and an interior surface, and said interior surface of said first drawer sidewall of said first drawer facing said interior surface of said second drawer sidewall of said first drawer, said interior surface of said first drawer sidewall of said first drawer being spaced from said interior surface of said second drawer sidewall of said first drawer by a distance that is not greater than said first distance;

at least one first drawer support member that supports said first drawer, said first drawer support member supporting said first drawer so that said first drawer is movable in a direction parallel to said length of said cabinet between an open position and a closed position, said first drawer support member supporting said first drawer so that a portion of said first drawer would extend beyond said vertical plane and outside of said space if said storage unit were mounted to said vehicle, if said first drawer were in its open position, and if said rear door of said vehicle were in its open position;

a second drawer disposed in said cabinet, said second drawer being positioned within said cabinet between said first cabinet wall portion and said second cabinet wall portion with no other drawer disposed between said first cabinet wall portion and said second drawer and with no other drawer disposed between said second cabinet wall portion and said second drawer, said second drawer comprising:

a first drawer sidewall having a length that is less than said second distance, said first drawer sidewall of said second drawer having an exterior surface and an interior surface;

a second drawer sidewall having a length that is less than said second distance, said second drawer sidewall of said second drawer being parallel to said first drawer sidewall of said second drawer, and said second drawer sidewall of said second drawer having an exterior surface and an interior surface, and said interior surface of said first drawer sidewall of said second drawer facing said interior surface of said second drawer sidewall of said second drawer, said interior surface of said first drawer sidewall of said second drawer being spaced from said interior surface of said second drawer sidewall of said second drawer by a distance that is not greater than said first distance; and at least one second drawer support member that supports said second drawer, said second drawer support member supporting said second drawer so that said second drawer is movable in a direction parallel to said length of said cabinet between an open position and a closed position, said second drawer support member supporting said second drawer so that a portion of said second drawer would extend beyond said vertical plane and outside of said space if said storage unit were mounted to said vehicle, if said second drawer were in its open position, and if said rear door of said vehicle were in its open position.

23. A storage unit as defined in claim 22 additionally comprising a retention member that is connectable to said cabinet, said retention member being movable between a first position in which said retention member prevents said first and second drawers from being opened and a second position in which said retention member does not prevent said first and second drawers from being opened.

24. A storage unit as defined in claim 23 additionally comprising a lock associated with said retention member, said lock allowing said retention member to be locked in said first position in which said first and second drawers are prevented from being opened.

25. A storage unit as defined in claim 22 wherein said retention member comprises a door that is pivotally connected to said cabinet via a hinge.

26. A storage unit as defined in claim 22 additionally comprising a mounting bracket that is capable of being fixed to said rear floor portion of said vehicle, said mounting bracket having a length that is less than said second distance, said cabinet being attachable to said mounting bracket and removable from said mounting bracket.

27. A storage unit as defined in claim 22 wherein said cabinet comprises:

a first exterior cabinet wall portion;

a second exterior cabinet wall portion spaced from said first exterior cabinet wall portion in a direction parallel to said width of said cabinet;

a first interior cabinet wall portion parallel to said first exterior cabinet wall portion, said first interior cabinet wall portion being spaced from said first exterior cabinet wall portion in a direction parallel to said width of said cabinet; and a second interior cabinet wall portion parallel to said second exterior cabinet wall portion, said second interior cabinet wall portion being spaced from said second exterior cabinet wall portion in a direction parallel to said width of said cabinet.

28. A storage unit sized to be capable of being mounted to a rear floor portion of a vehicle having a vehicle sidewall, a wheel well having a portion which extends outwardly from a portion of said sidewall by a first distance in a first direction, and a rear vehicle door that is movable between a closed position and an open position, said rear vehicle door being spaced from a rear portion of said wheel well by a second distance in a second direction perpendicular to said first direction and parallel to said vehicle sidewall, said storage unit comprising:

a cabinet having a bottom portion that is capable of being mounted to said rear floor portion of said vehicle between a first line coinciding with a rear portion of said wheel well and a second line coinciding with an interior portion of said rear vehicle door when said rear vehicle door is in its closed position, said cabinet being shaped so that no portion of said cabinet would extend beyond a vertical plane coinciding with said interior portion of said rear door if said storage unit were mounted to said vehicle and if said rear door were in its closed position, and so that said cabinet would not extend over said sidewall of said vehicle if said storage unit were mounted to said vehicle, said cabinet having a width, a length greater than said width and a depth, said cabinet comprising a first cabinet wall portion and a second cabinet wall portion spaced from said first cabinet wall portion in a direction parallel to said width of said cabinet;

a first drawer disposed in said cabinet, said first drawer being positioned within said cabinet between said first cabinet wall portion and said second cabinet wall portion with no other drawer disposed between said first cabinet wall portion and said first drawer and with no other drawer disposed between said second cabinet wall portion and said first drawer, said first drawer comprising:

a first drawer sidewall having a length that is less than said second distance, said first drawer sidewall of said first drawer having an exterior surface and an interior surface;

a second drawer sidewall having a length that is less than said second distance, said second drawer sidewall of said first drawer being parallel to said first drawer sidewall of said first drawer, and said second drawer sidewall of said first drawer having an exterior surface and an interior surface, and said interior surface of said first drawer sidewall of said first drawer facing said interior surface of said second drawer sidewall of said first drawer, said interior surface of said first drawer sidewall of said first drawer being spaced from said interior surface of said second drawer sidewall of said first drawer by a distance that is not greater than said first distance;

at least one first drawer support member that supports said first drawer, said first drawer supporter supporting said first drawer so that said first drawer is movable in a direction parallel to said length of said cabinet between an open position and a closed position, said first drawer support member supporting said first drawer so that a portion of said first drawer would extend beyond said vertical plane if said storage unit were mounted to said vehicle, if said first drawer were in its open position, and if said rear door of said vehicle were in its open position;

a second drawer disposed in said cabinet, said second drawer being positioned within said cabinet between said first cabinet wall portion and said second cabinet wall portion with no other drawer disposed between said first cabinet wall portion and said second drawer and with no other drawer disposed between said second cabinet wall portion and said second drawer, said cabinet not having any drawer disposed therein that has a length greater than said second distance, said second drawer comprising:

a first drawer sidewall having a length that is less than said second distance, said first drawer sidewall of said second drawer having an exterior surface and an interior surface;

a second drawer sidewall having a length that is less than said second distance, said second drawer sidewall of said second drawer being parallel to said first drawer sidewall of said second drawer, and said second drawer sidewall of said second drawer having an exterior surface and an interior surface, and said interior surface of said first drawer sidewall of said second drawer facing said interior surface of said second drawer sidewall of said second drawer, said interior surface of said first drawer sidewall of said second drawer being spaced from said interior surface of said second drawer sidewall of said second drawer by a distance that is not greater than said first distance;

at least one second drawer support member that supports said second drawer, said second drawer support member supporting said second drawer so that said second drawer is movable in a direction parallel to said length of said cabinet between an open position and a closed position, said second drawer support member support said second drawer so that a portion of said second drawer would extend beyond said vertical plane if said storage unit were mounted to said vehicle, if said second drawer were in its open position, and if said rear door of said vehicle were in its open position; and a mounting bracket associated with said cabinet, said mounting bracket being capable of being fixed to said rear floor portion of said vehicle, said mounting bracket having a length that is less than said second distance, said cabinet being attachable to said mounting bracket and removable from said mounting bracket.

29. A storage unit as defined in claim 28 additionally comprising a retention member that is connectable to said cabinet, said retention member being movable between a first position in which said retention member prevents said first and second drawers from being opened and a second position in which said retention member does not prevent said first and second drawers from being opened.

30. A storage unit as defined in claim 29 additionally comprising a lock associated with said retention member, said lock allowing said retention member to be locked in said first position in which said first and second drawers are prevented from being opened.

31. A storage unit as defined in claim 28 wherein said retention member comprises a door that is pivotally connected to said cabinet via a hinge.

32. A storage unit as defined in claim 28 wherein said cabinet comprises:

a first exterior cabinet wall portion;

a second exterior cabinet wall portion spaced from said first exterior cabinet wall portion in a direction parallel to said width of said cabinet;

a first interior cabinet wall portion parallel to said first exterior cabinet wall portion, said first interior cabinet wall portion being spaced from said first exterior cabinet wall portion in a direction parallel to said width of said cabinet; and a second interior cabinet wall portion parallel to said second exterior cabinet wall portion, said second interior cabinet wall portion being spaced from said second exterior cabinet wall portion in a direction parallel to said width of said cabinet.

* * * * *